Patented Feb. 2, 1943

2,310,143

UNITED STATES PATENT OFFICE 2,310,143

DYESTUFFS OF THE ANTHRAQUINONE SERIES

Alexander J. Wuertz and Myron S. Whelen, Wilmington, Del., assignors to E. I. du Pont de Nemours & Company, Wilmington, Del., a corporation of Delaware No Drawing. Application March 26, 1941, Serial No. 385,304

1 Claim. (Cl. 260—367)

This invention relates to the production of new dyestuffs of the anthraquinone series and more particularly to the preparation of acid wool dyestuffs of the dianthraquinonylamine type.

Very few of the anthraquinone compounds of higher molecular weight such as those containing two or more anthraquinone nuclei linked together have been found commercially suited for use in the dyeing of wool, silk and related fibers, apparently because of their lack of affinity when converted to the water soluble sulfonic acids. A few compounds, however, of higher molecular weight have been found to show sufficient affinity for wool when converted to the water soluble sulfonic acids to make them of possible use in this field. It has been found that in general these higher molecular weight compounds show better fastness properties when applied to wool and silk than many of the lower molecular weight compounds of the anthraquinone acid wool series such as the arylaminoanthraquinone sulfonic acids and there is a continuous search for desirable colors in the anthraquinone field which can be used for the dyeing of wool and silk and which will exhibit improved fastness properties.

It is an object of this invention to prepare wool dyestuffs of the anthraquinone series which dye in gray shades and which exhibit improved fastness properties over the known dyestuffs of similar shade of the arylaminoanthraquinone type which are now available.

We have found that a very desirable bluish gray dyestuff can be produced in the anthraquinone series which exhibits good fastness properties by condensing 1-benzoylamino-4-chloroanthraquinone with 1-amino-4-hydroxy-anthraquinone, then hydrolyzing off the benzoyl group and sulfonating the product giving what is generally considered to be the 4-amino-4'-hydroxy-1,1'-dianthraquinonylamine sulfonic acid. This compound may of course be prepared over other routes such as by the condensation of 1-benzoylamino-4-aminoanthraquinone with 1-chloro-4-hydroxy-anthraquinone with subsequent hydrolysis of the benzoyl group and sulfonation, or it may be prepared by direct condensation of 1,4-diaminoanthraquinone with 1-chloro-4-hydroxy-anthraquinone in equal molecular proportions, with sulfonation of the resulting product. The sulfonation of this compound, irrespective of the method by which it is prepared, may advantageously be carried out in fuming sulfuric acid of between 20-40% sulphur trioxide content and at temperatures of from 90-100° C. Where boric acid or mercury salts are employed in the sulfonation, temperatures of from 120-150° may be used. The amount of boric acid employed should be in approximately equal molecular proportions based on the dianthraquinonylamine. The sulfonation is considered completed when test portions worked up in the usual manner show complete solubility in water. Usually from 2-3 hours are required to complete the sulfonation. The sulfonation product may be worked up by diluting the sulfonation mass with water to an acid concentration of from 54-57% then filtering off the precipitated dyestuff; or the sulfonation product may be drowned in water and filtered off in which case a somewhat less pure product is obtained. The product is obtained in the form of a dark powder which when dry is readily soluble in water. It dyes wool from an acid bath in clear strong bluish gray shades and exhibits good fastness particularly to light, fulling and washing. On chroming this dyestuff shows comparatively little change in color being converted to a somewhat greener shade of gray, making it particularly suitable for use in mixtures with other colors which require chroming. In this specification and claim the expression "bluish gray" is used in contradistinction to reddish gray for this color dyes in gray shades which do not contain the red component which characterizes the so-called reddish grays.

The following examples are given to illustrate the invention. The parts used are by weight.

Example 1

Fifteen (15) parts of 4-amino-4'-hydroxy-1:1'-dianthraquinonylamine are introduced under good agitation into one hundred and fifty (150) parts of fuming sulfuric acid of 28% free $SO_3$ content, to which nine (9) parts of boric acid and one-tenth (0.1) part of mercuric oxide have been added. The reaction mixture is heated while stirring to 135-140° C., until a test portion readily dissolves in warm water, which usually takes about 2 hours. The reaction mass is cooled, and poured into 2000 parts of water, containing ten (10) parts of sodium sulfite, after which three hundred (300) parts of sodium chloride are added and the whole is boiled. After cooling the precipitated dyestuff is filtered off, washed free from acid with 5% sodium chloride solution and dried. A dark powder is thus obtained, easily soluble in water. It dyes wool from an acid bath clear bluish gray shades of excellent fastness properties.

*Example 2*

Seventy-five (75) parts of 4-amino-4'-hydroxy-1:1'-dianthraquinonylamine are dissolved, while agitating in nine hundred (900) parts of fuming sulfuric acid of 25% free $SO_3$ content to which have been added thirty (30) parts of boric acid and seven-tenths (0.7) part of mercuric oxide. One hundred (100) parts of fuming sulfuric acid of 65% free $SO_3$ content are then added and the whole is heated at 145° C., until a test portion shows complete solubility in warm water, which is usually in about three hours. After cooling one thousand (1000) parts of water are added to the charge below 50° C., followed by twenty (20) parts of sodium bisulfite. After stirring for one-half hour the precipitated dyestuff is filtered off and the cake washed with seven hundred (700) parts of 50% sulfuric acid. The dyestuff is stirred in 5% brine solution, followed by filtration and washing of the cake with 5% brine solution until free from acid, after which it is dried. The product so obtained is a dark powder, easily soluble in water, which dyes wool from an acid bath in bluish gray shades of excellent fastness, especially towards washing, fulling and light.

*Example 3*

If in Example 2 the use of mercuric oxide is omitted, a product which dyes wool from an acid bath in bluish gray shades slightly greener than that obtained in Example 2 is obtained.

*Example 4*

If in Example 1, the use of mercuric oxide and boric acid is omitted during the sulfonation, the sulfonation takes place at 95–100° C. The dyestuff so obtained is conveniently isolated by the method used in Example 2, and a product slightly less pure than that obtained in Example 2 is secured, dyeing wool from an acid bath in bluish gray shades.

We claim:

The water soluble sulfonation derivative of 4 - amino - 4' - hydroxy - 1,1' - dianthraquinonylamine which dies wool from the usual acid bath in clear strong bluish gray shades of good fastness properties.

ALEXANDER J. WUERTZ.
MYRON S. WHELEN.